(12) United States Patent
Yancey et al.

(10) Patent No.: US 10,964,121 B2
(45) Date of Patent: *Mar. 30, 2021

(54) TECHNOLOGIES FOR MERGING THREE-DIMENSIONAL MODELS OF DENTAL IMPRESSIONS

(71) Applicant: SDC U.S. SmilePay SPV, Nashville, TN (US)

(72) Inventors: Christopher Yancey, Nashville, TN (US); Josh Long, Nashville, TN (US)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,439

(22) Filed: Oct. 19, 2018

(65) Prior Publication Data

US 2019/0164352 A1 May 30, 2019

Related U.S. Application Data

(63) Continuation of application No. 15/825,760, filed on Nov. 29, 2017, now Pat. No. 10,109,114.

(51) Int. Cl.
*G06T 19/20* (2011.01)

(52) U.S. Cl.
CPC .......... *G06T 19/20* (2013.01); *G06T 2210/41* (2013.01); *G06T 2219/2004* (2013.01)

(58) Field of Classification Search
CPC ..... A61C 13/0004; A61C 7/002; A61C 13/34; A61C 9/0053; A61C 9/0046; A61C 9/002; A61C 7/08; A61C 11/00; A61B 5/4547

See application file for complete search history.

(56) References Cited

U.S. PATENT DOCUMENTS

| | | | |
|---|---|---|---|
| 5,886,702 A | 3/1999 | Migdal et al. |
| 5,945,996 A | 8/1999 | Migdal et al. |
| 6,208,347 B1 | 3/2001 | Migdal et al. |
| 7,698,014 B2 | 4/2010 | Dunne et al. |

(Continued)

OTHER PUBLICATIONS

International Search Report and Written Opinion for International Application No. PCT/US2018/062824, dated Jan. 2, 2019, 8 pages.

(Continued)

*Primary Examiner* — Abderrahim Merouan
(74) *Attorney, Agent, or Firm* — Foley & Lardner LLP

(57) ABSTRACT

Technologies for merging three-dimensional models of dental impressions include a computing device that generates multiple three-dimensional models that are each indicative of a dental impression of a user's dental arch. The models may be generated by scanning the dental impressions. The computing device determines whether a model is indicative of the complete anatomy of the user's arch and, if not, merges multiple models with a merge strategy to generate a merged model. The models may be merged by aligning geometry of the models, selecting geometry from one of the models using the merge strategy, and generating the merged model that includes the selected geometry. The merge strategy may include selecting from the model associated with the dental impression that includes the most detail of the user's anatomy or selecting from the model with the greatest depth.

20 Claims, 4 Drawing Sheets

(56) References Cited

U.S. PATENT DOCUMENTS

| | | | |
|---|---|---|---|
| 7,702,492 B2 * | 4/2010 | Marshall | G06T 17/00 433/68 |
| 7,831,322 B2 * | 11/2010 | Liu | A61C 8/0089 700/95 |
| 8,234,000 B2 | 7/2012 | Andersson et al. | |
| 8,995,732 B2 | 3/2015 | Kaza et al. | |
| 9,301,814 B2 | 4/2016 | Kaza et al. | |
| 9,626,462 B2 * | 4/2017 | Somasundaram | G06F 17/50 |
| 9,684,952 B2 | 6/2017 | Carlson et al. | |
| 9,829,710 B1 | 11/2017 | Newell et al. | |
| 9,839,494 B2 | 12/2017 | Kaza et al. | |
| 10,143,537 B2 | 12/2018 | Kaza et al. | |
| 10,162,908 B1 | 12/2018 | Bhaskara et al. | |
| 10,335,252 B2 | 7/2019 | Kaza et al. | |
| 10,398,539 B2 | 9/2019 | Nilsson | |
| 10,405,947 B1 | 9/2019 | Kaza et al. | |
| 2006/0040236 A1 * | 2/2006 | Schmitt | A61C 11/00 433/213 |
| 2006/0204078 A1 * | 9/2006 | Orth | A61C 13/0004 382/154 |
| 2006/0263738 A1 | 11/2006 | Kuo | |
| 2006/0275736 A1 * | 12/2006 | Wen | A61C 9/00 433/213 |
| 2007/0207437 A1 * | 9/2007 | Sachdeva | A61C 7/00 433/24 |
| 2008/0206705 A1 | 8/2008 | Kaza et al. | |
| 2009/0148816 A1 * | 6/2009 | Marshall | A61C 5/77 433/223 |
| 2009/0160855 A1 * | 6/2009 | Wu | G06T 17/10 345/420 |
| 2009/0220134 A1 | 9/2009 | Cahill et al. | |
| 2009/0316966 A1 * | 12/2009 | Marshall | A61B 6/5217 382/128 |
| 2010/0324875 A1 * | 12/2010 | Kalili | A61C 13/0004 703/11 |
| 2011/0196653 A1 * | 8/2011 | Lajoie | A61C 9/004 703/1 |
| 2011/0200248 A1 | 8/2011 | Gerones et al. | |
| 2012/0015316 A1 * | 1/2012 | Sachdeva | G06T 17/00 433/24 |
| 2012/0191421 A1 | 7/2012 | Greenberg | |
| 2012/0330447 A1 | 12/2012 | Gerlach et al. | |
| 2014/0026419 A1 * | 1/2014 | Haber | A61C 1/084 29/896.1 |
| 2014/0037194 A1 | 2/2014 | Kitamura et al. | |
| 2014/0051037 A1 * | 2/2014 | Fisker | A61C 8/0048 433/213 |
| 2014/0203463 A1 * | 7/2014 | Haber | A61C 8/0089 264/16 |
| 2014/0254919 A1 * | 9/2014 | Sun | G06T 7/194 382/154 |
| 2015/0182316 A1 * | 7/2015 | Morales | A61C 13/01 433/199.1 |
| 2015/0199839 A1 | 7/2015 | Chon | |
| 2015/0264299 A1 | 9/2015 | Leech et al. | |
| 2015/0348320 A1 * | 12/2015 | Pesach | A61C 19/04 382/128 |
| 2016/0148375 A1 | 5/2016 | Oh et al. | |
| 2016/0220200 A1 * | 8/2016 | Sandholm | A61B 8/08 |
| 2016/0324597 A1 * | 11/2016 | Colby | A61B 18/148 |
| 2017/0061588 A1 | 3/2017 | Lee et al. | |
| 2017/0312060 A1 * | 11/2017 | Morales | A61C 13/0004 |
| 2017/0340390 A1 | 11/2017 | Harbison et al. | |
| 2017/0345147 A1 * | 11/2017 | Ohtake | G06T 7/75 |
| 2018/0025496 A1 | 1/2018 | Lindner et al. | |
| 2018/0091169 A1 * | 3/2018 | Colby | A61C 3/14 |
| 2018/0350134 A1 | 12/2018 | Lodato et al. | |
| 2019/0246000 A1 * | 8/2019 | Cheng | H04N 1/193 |
| 2019/0282344 A1 * | 9/2019 | Azernikov | A61C 13/0004 |
| 2019/0388188 A1 | 12/2019 | Kaza et al. | |

OTHER PUBLICATIONS

International Search Report and Written Opinion for International Application No. PCT/US2020/014989, dated May 13, 2020, 12 pages.

* cited by examiner

TECHNOLOGIES FOR MERGING THREE-DIMENSIONAL MODELS OF DENTAL IMPRESSIONS

CROSS REFERENCE TO RELATED PATENT APPLICATIONS

This application is a continuation of U.S. patent application Ser. No. 15/825,760 filed Nov. 29, 2017, which is incorporated herein by reference in its entirety.

TECHNICAL FIELD

The present disclosure relates to three-dimensional computer modeling and, more specifically, to a system and method for merging three-dimensional models of dental impressions.

BACKGROUND

A dental impression provides a negative imprint of the teeth and tissues in the mouth. The negative impression may then be utilized to produce a physical or digital reproduction of the teeth, e.g., dentures and orthodontics. Generally, a dental tray having a viscous, thixotropic impression material therein is fit over the dental arches of the patient. The impression material sets to a solid leaving an imprint of the structures in the mouth. When removed from the mouth, the impression provides a detailed and stable negative of the teeth. Optionally, the impression is processed using digital scanning methods to create the digital negative of the teeth.

Traditionally, dental impressions are made in a dental office and require significant time. The impressions are then delivered to an outside vendor that utilizes the impression to form a positive model of the teeth. If the dental impression includes any errors, e.g., incomplete impression of the teeth and tissues, the patient may be required to return to the dental office to have a second impression made.

As an alternative method to traditional orthodontic procedures, in less severe cases, dental impressions may be made with an at-home dental impression kit. Such kits are generally prescribed by a dental professional to qualified customers, e.g., in a dental office. The user may then administer the contents of the dental impression kit at home. After completing the dental impressions, the kit is returned to the dental professional. Some at-home kits may be difficult to administer and/or may result in poor quality dental impressions.

SUMMARY

According to one aspect of the disclosure, a computing device for dental impression scan merging includes a model manager, a scan dispositioner, and a merge manager. The model manager is configured to generate a first model and a second model, wherein the first model includes a three-dimensional model indicative of a first dental impression of a user's dental arch, and wherein the second model includes a three-dimensional model indicative of a second dental impression of the user's dental arch. The scan dispositioner is configured to determine whether the first model is indicative of a complete anatomy of the user's dental arch. The merge manager is configured to merge the first model and the second model with a merge strategy to generate a merged model in response to a determination that the first model is not indicative of the complete anatomy of the user's dental arch. The user's dental arch may include a mandibular arch or a maxillary arch.

In some embodiments, the scan dispositioner is further configured to determine whether the merged model is indicative of the complete anatomy of the user's dental arch. The model manager is further configured to generate a third model in response to a determination that the merged model is not indicative of the complete anatomy, wherein the third model includes a three-dimensional model indicative of a third dental impression of the user's dental arch. The merge manager is further configured to merge the first model, the second model, and the third model with the merge strategy to generate a second merged model.

In some embodiments, to merge the first model and the second model with the merge strategy may include to select a selected geometry from the first model or the second model with the merge strategy, wherein the selected geometry is associated with a common anatomical location in the user's dental arch; and generate the merged model in response to identification of the selected geometry, wherein the merged model includes the selected geometry. In some embodiments, to merge the first model and the second model further includes to align geometry of the first model and the second model based on a common point in each of the first model and the second model; wherein to select the selected geometry includes to select the selected geometry in response to alignment of the geometry. In some embodiments, to align the geometry based on the common point includes to receive the common point from a technician. In some embodiments, to align the geometry based on the common point includes to fit the anatomy of the user's dental arch.

In some embodiments, to select the selected geometry from the first model or the second model with the merge strategy may include to determine whether the first dental impression includes more detail associated with the common anatomical location than the second dental impression; and select the selected geometry from the first model in response to a determination that the first dental impression includes more detail. In some embodiments, to select the selected geometry further includes to select the selected geometry from the second model in response to a determination that the first dental impression does not include more detail. In some embodiments, to select the selected geometry from the first model or the second model with the merge strategy may include to determine whether the first model includes greater depth associated with the common anatomical location than the second model; and select the selected geometry from the first model in response to a determination that the first model includes greater depth.

In some embodiments, to merge the first model and the second model further includes to clean the merged model to generate a closed surface. In some embodiments, to clean the merged model includes to perform Poisson surface reconstruction or a gap closing algorithm.

In some embodiments, to merge the first model and the second model further includes to merge the first model and the second model with a plurality of merge strategies to generate a plurality of merge models. In some embodiments, the merge manager is further configured to select the merged model from the plurality of merged models in response to merging of the first model and the second model. In some embodiments, to select the merged model includes to present the plurality of merged models to a technician; and receive a selection of the merged model from the technician in response to presentation of the plurality of merged models.

In some embodiments, to generate the first model includes to scan the first dental impression to generate the first model; and to generate the second model includes to scan the second dental impression to generate the second model.

According to another aspect of the disclosure, a computing device for three-dimensional model merging includes a merge manager to align geometry of a first model and a second model, wherein the first model includes a three-dimensional model indicative of a first physical object and the second model includes a three-dimensional model indicative of a second physical object; identify a common location in each of the first model and the second model in response to alignment of the geometry; select selected geometry from the first model or the second model with a merge strategy, wherein the selected geometry is associated with the common location; and generate a merged model, wherein the merged model includes a three-dimensional model that includes the selected geometry. In some embodiments, the first physical object may include a first dental impression of a user's dental arch, and the second physical object may include a second dental impression of the user's dental arch.

In some embodiments, to align the geometry of the first model and the second model includes to align the geometry based on a common point in each of the first model and the second model. In some embodiments, to align the geometry based on the common point includes to receive the common point from a technician. In some embodiments, to align the geometry based on the common point includes to fit anatomy of a user's dental arch, wherein the first model is indicative of a first dental impression of the user's dental arch, and the second model is indicative of a second dental impression of the user's dental arch.

In some embodiments, the first model is indicative of a first dental impression of a user's dental arch; the second model is indicative of a second dental impression of the user's dental arch; and to select the selected geometry with the merge strategy includes to determine which of the first dental impression and the second dental impression includes more detail of the user's dental arch. In some embodiments, to determine which of the first dental impression and the second dental impression includes more detail includes to determine which of the first model and the second model includes greater depth.

In some embodiments, the merge manager is further configured to clean the merged model to generate a closed surface. In some embodiments, to clean the merged model includes to perform Poisson surface reconstruction or a gap closing algorithm.

In some embodiments, to select the selected geometry includes to select the selected geometry with a plurality of merge strategies; and to generate the merged model includes to generate a plurality of merged models, wherein each merged model corresponds to a merge strategy. In some embodiments, the merge manager is further configured to select a merged model from the plurality of merged models. In some embodiments, the merge manager is further configured to present the plurality of merged models to a technician; and receive a selection of the best-merged model from the technician in response to presentation of the plurality of merged models; wherein to select the merged model includes to select the best-merged model.

According to another aspect of the disclosure, a method for dental impression scan merging includes generating, by a computing device, a first model and a second model, wherein the first model includes a three-dimensional model indicative of a first dental impression of a user's dental arch, and wherein the second model includes a three-dimensional model indicative of a second dental impression of the user's dental arch; determining, by the computing device, whether the first model is indicative of a complete anatomy of the user's dental arch; and merging, by the computing device, the first model and the second model using a merge strategy to generate a merged model in response to determining that the first model is not indicative of the complete anatomy of the user's dental arch. The user's dental arch may include a mandibular arch or a maxillary arch.

In some embodiments, the method further includes determining, by the computing device, whether the merged model is indicative of the complete anatomy of the user's dental arch; generating, by the computing device, a third model in response to determining that the merged model is not indicative of the complete anatomy, wherein the third model includes a three-dimensional model indicative of a third dental impression of the user's dental arch; and merging, by the computing device, the first model, the second model, and the third model using the merge strategy to generate a second merged model.

In some embodiments, merging the first model and the second model using the merge strategy includes selecting a selected geometry from the first model or the second model using the merge strategy, wherein the selected geometry is associated with a common anatomical location in the user's dental arch; and generating the merged model in response to identifying the selected geometry, wherein the merged model includes the selected geometry. In some embodiments, merging the first model and the second model further includes aligning geometry of the first model and the second model based on a common point in each of the first model and the second model; wherein selecting the selected geometry includes selecting the selected geometry in response to aligning the geometry. In some embodiments, aligning the geometry based on the common point includes receiving the common point from a technician. In some embodiments, aligning the geometry based on the common point includes fitting the anatomy of the user's dental arch.

In some embodiments, selecting the selected geometry from the first model or the second model using the merge strategy includes determining whether the first dental impression includes more detail associated with the common anatomical location than the second dental impression; and selecting the selected geometry from the first model in response to determining that the first dental impression includes more detail. In some embodiments, selecting the selected geometry further includes selecting the selected geometry from the second model in response to determining that the first dental impression does not include more detail. In some embodiments, selecting the selected geometry from the first model or the second model using the merge strategy includes determining whether the first model includes greater depth associated with the common anatomical location than the second model; and selecting the selected geometry from the first model in response to determining that the first model includes greater depth.

In some embodiments, merging the first model and the second model further includes cleaning the merged model to generate a closed surface. In some embodiments, cleaning the merged model includes performing Poisson surface reconstruction or a gap closing algorithm.

In some embodiments, merging the first model and the second model further includes merging the first model and the second model using a plurality of merge strategies to generate a plurality of merge models. In some embodiments, the method further includes selecting, by the computing device, the merged model from the plurality of merged models in response to merging the first model and the second model. In some embodiments, selecting the merged model includes presenting the plurality of merged models to a technician; and receiving a selection of the merged model from the technician in response to presenting the plurality of merged models.

In some embodiments, generating the first model includes scanning the first dental impression to generate the first model; and generating the second model includes scanning the second dental impression to generate the second model.

According to another aspect of the disclosure, a method for three-dimensional model merging includes aligning, by a computing device, geometry of a first model and a second model, wherein the first model includes a three-dimensional model indicative of a first physical object and the second model includes a three-dimensional model indicative of a second physical object; identifying, by the computing device, a common location in each of the first model and the second model in response to aligning the geometry; selecting, by the computing device, selected geometry from the first model or the second model using a merge strategy, wherein the selected geometry is associated with the common location; and generating, by the computing device, a merged model, wherein the merged model includes a three-dimensional model that includes the selected geometry. In some embodiments, the first physical object includes a first dental impression of a user's dental arch, and the second physical object includes a second dental impression of the user's dental arch.

In some embodiments, aligning the geometry of the first model and the second model includes aligning the geometry based on a common point in each of the first model and the second model. In some embodiments, aligning the geometry based on the common point includes receiving the common point from a technician. In some embodiments, aligning the geometry based on the common point includes fitting anatomy of a user's dental arch, wherein the first model is indicative of a first dental impression of the user's dental arch, and the second model is indicative of a second dental impression of the user's dental arch.

In some embodiments, the first model is indicative of a first dental impression of a user's dental arch; the second model is indicative of a second dental impression of the user's dental arch; and selecting the selected geometry using the merge strategy includes determining which of the first dental impression and the second dental impression includes more detail of the user's dental arch. In some embodiments, determining which of the first dental impression and the second dental impression includes more detail includes determining which of the first model and the second model includes greater depth.

In some embodiments, the method further includes cleaning, by the computing device, the merged model to generate a closed surface. In some embodiments, cleaning the merged model includes performing Poisson surface reconstruction or a gap closing algorithm.

In some embodiments, selecting the selected geometry includes selecting the selected geometry with a plurality of merge strategies; and generating the merged model includes generating a plurality of merged models, wherein each merged model corresponds to a merge strategy. In some embodiments, the method further includes selecting, by the computing device, a merged model from the plurality of merged models. In some embodiments, the method further includes presenting, by the computing device, the plurality of merged models to a technician; and receiving, by the computing device, a selection of the best-merged model from the technician in response to presenting the plurality of merged models; wherein selecting the merged model includes selecting the best-merged model.

According to another aspect of the disclosure, one or more machine readable storage media include a plurality of instructions stored thereon that in response to being executed result in a computing device generating a first model and a second model, wherein the first model includes a three-dimensional model indicative of a first dental impression of a user's dental arch, and wherein the second model includes a three-dimensional model indicative of a second dental impression of the user's dental arch; determining whether the first model is indicative of a complete anatomy of the user's dental arch; and merging the first model and the second model using a merge strategy to generate a merged model in response to determining that the first model is not indicative of the complete anatomy of the user's dental arch. The user's dental arch may include a mandibular arch or a maxillary arch.

In some embodiments, the one or more machine readable storage media further include a plurality of instructions stored thereon that in response to being executed result in the computing device determining whether the merged model is indicative of the complete anatomy of the user's dental arch; generating a third model in response to determining that the merged model is not indicative of the complete anatomy, wherein the third model includes a three-dimensional model indicative of a third dental impression of the user's dental arch; and merging the first model, the second model, and the third model using the merge strategy to generate a second merged model.

In some embodiments, merging the first model and the second model using the merge strategy includes selecting a selected geometry from the first model or the second model using the merge strategy, wherein the selected geometry is associated with a common anatomical location in the user's dental arch; and generating the merged model in response to identifying the selected geometry, wherein the merged model includes the selected geometry. In some embodiments, merging the first model and the second model further includes aligning geometry of the first model and the second model based on a common point in each of the first model and the second model; wherein selecting the selected geometry includes selecting the selected geometry in response to aligning the geometry. In some embodiments, aligning the geometry based on the common point includes receiving the common point from a technician. In some embodiments, aligning the geometry based on the common point includes fitting the anatomy of the user's dental arch.

In some embodiments, selecting the selected geometry from the first model or the second model using the merge strategy includes determining whether the first dental impression includes more detail associated with the common anatomical location than the second dental impression; and selecting the selected geometry from the first model in response to determining that the first dental impression includes more detail. In some embodiments, selecting the selected geometry further includes selecting the selected geometry from the second model in response to determining that the first dental impression does not include more detail. In some embodiments, selecting the selected geometry from the first model or the second model using the merge strategy includes determining whether the first model includes greater depth associated with the common anatomical location than the second model; and selecting the selected geometry from the first model in response to determining that the first model includes greater depth.

In some embodiments, merging the first model and the second model further includes cleaning the merged model to generate a closed surface. In some embodiments, cleaning the merged model includes performing Poisson surface reconstruction or a gap closing algorithm.

In some embodiments, merging the first model and the second model further includes merging the first model and the second model using a plurality of merge strategies to generate a plurality of merge models. In some embodiments, the one or more machine readable storage media further include a plurality of instructions stored thereon that in response to being executed result in the computing device selecting the merged model from the plurality of merged models in response to merging the first model and the second model. In some embodiments, selecting the merged model includes presenting the plurality of merged models to a technician; and receiving a selection of the merged model from the technician in response to presenting the plurality of merged models.

In some embodiments, generating the first model includes scanning the first dental impression to generate the first model; and generating the second model includes scanning the second dental impression to generate the second model.

According to another aspect of the disclosure, one or more machine readable storage media include a plurality of instructions stored thereon that in response to being executed result in a computing device aligning geometry of a first model and a second model, wherein the first model includes a three-dimensional model indicative of a first physical object and the second model includes a three-dimensional model indicative of a second physical object; identifying a common location in each of the first model and the second model in response to aligning the geometry; selecting selected geometry from the first model or the second model using a merge strategy, wherein the selected geometry is associated with the common location; and generating a merged model, wherein the merged model includes a three-dimensional model that includes the selected geometry. In some embodiments, the first physical object includes a first dental impression of a user's dental arch, and the second physical object includes a second dental impression of the user's dental arch.

In some embodiments, aligning the geometry of the first model and the second model includes aligning the geometry based on a common point in each of the first model and the second model. In some embodiments, aligning the geometry based on the common point includes receiving the common point from a technician. In some embodiments, aligning the geometry based on the common point includes fitting anatomy of a user's dental arch, wherein the first model is indicative of a first dental impression of the user's dental arch, and the second model is indicative of a second dental impression of the user's dental arch.

In some embodiments, the first model is indicative of a first dental impression of a user's dental arch; the second model is indicative of a second dental impression of the user's dental arch; and selecting the selected geometry using the merge strategy includes determining which of the first dental impression and the second dental impression includes more detail of the user's dental arch. In some embodiments, determining which of the first dental impression and the second dental impression includes more detail includes determining which of the first model and the second model includes greater depth.

In some embodiments, the one or more machine readable storage media further include a plurality of instructions stored thereon that in response to being executed result in the computing device cleaning the merged model to generate a closed surface. In some embodiments, cleaning the merged model includes performing Poisson surface reconstruction or a gap closing algorithm.

In some embodiments, selecting the selected geometry includes selecting the selected geometry with a plurality of merge strategies; and generating the merged model includes generating a plurality of merged models, wherein each merged model corresponds to a merge strategy. In some embodiments, the one or more machine readable storage media further include a plurality of instructions stored thereon that in response to being executed result in the computing device selecting a merged model from the plurality of merged models. In some embodiments, the one or more machine readable storage media further include a plurality of instructions stored thereon that in response to being executed result in the computing device presenting the plurality of merged models to a technician; and receiving a selection of the best-merged model from the technician in response to presenting the plurality of merged models; wherein selecting the merged model includes selecting the best-merged model.

BRIEF DESCRIPTION OF THE DRAWINGS

The foregoing and other features of the various embodiments of the methods and apparatuses described herein will become more apparent from the following detailed description and the accompanying drawings in which.

DETAILED DESCRIPTION

Figure 1:
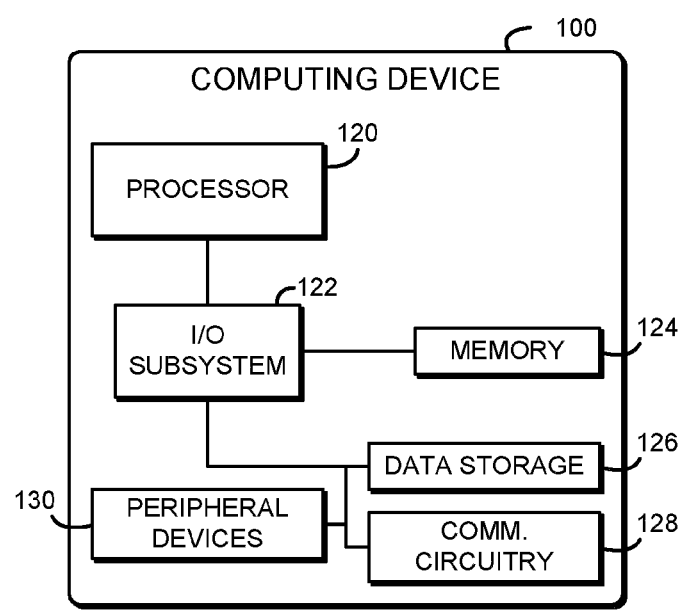
FIG. 1 is a simplified block diagram of at least one embodiment of a computing device for merging three-dimensional models.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a fain' readable by a machine (e.g., a volatile or non-volatile memory, a media disc, or other media device).

Referring now to FIG. 1, an illustrative computing device 100 for merging three-dimensional models of dental impressions is shown. In use, as described further below, the computing device 100 generates or otherwise acquires three-dimensional models for each of multiple dental impressions. For example, multiple dental impressions created by a user with an at-home dental impression kit may be scanned to generate the three-dimensional models. The computing device 100 automatically merges geometry from the models to generate a complete model of one or more of the user's dental arches. In some embodiments, the computing device 100 may use multiple merge strategies and select the best merged model. Thus, the computing device 100 may generate a higher-quality merged model as compared to any of the individual models. Additionally, the computing device 100 may be able to generate a complete model from multiple incomplete dental impressions, which may improve the proportion of at-home dental kits that are successfully completed and/or reduce the number of retake impression kits that are sent to users (e.g., customers).

The computing device 100 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As such, the computing device 100 may be embodied as a single server computing device or a collection of servers and associated devices. For example, in some embodiments, the computing device 100 may be embodied as a "virtual server" formed from multiple computing devices distributed across a network and operating in a public or private cloud. Accordingly, although the computing device 100 is illustrated in FIG. 1 and described below as embodied as a single server computing device, it should be appreciated that the computing device 100 may be embodied as multiple devices cooperating together to facilitate the functionality described below.

As shown in FIG. 1, the computing device 100 illustratively include a processor 120, an input/output subsystem 122, a memory 124, a data storage device 126, and a communication subsystem 128, and/or other components and devices commonly found in a server computer or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, InfiniBand®, Bluetooth®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
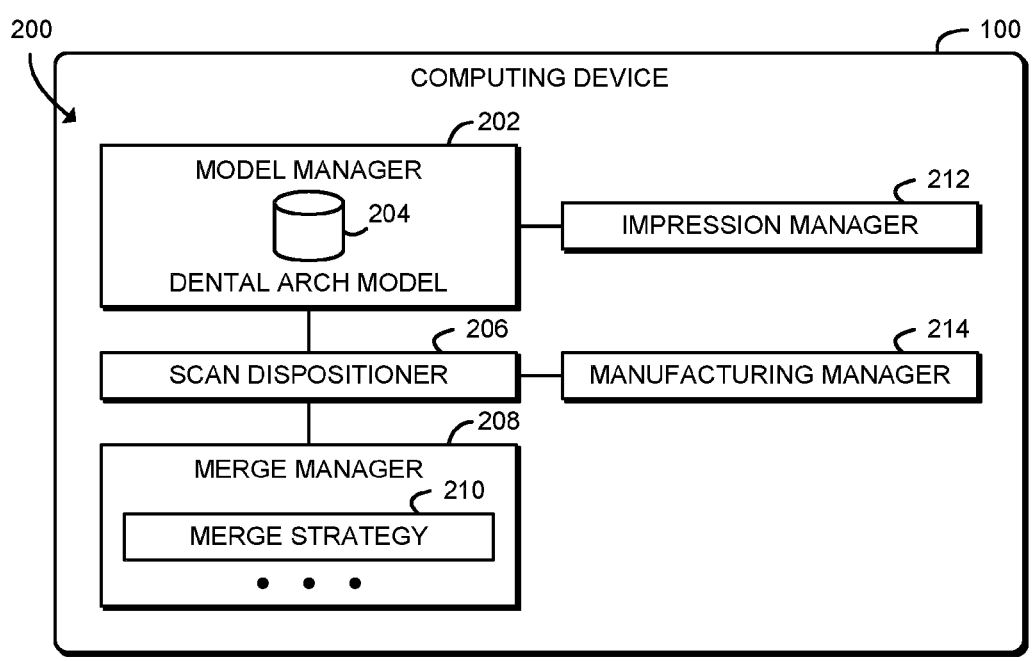
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes model manager 202, a scan dispositioner 206, a merge manager 208, an impression manager 212, and a manufacturing manager 214. The various components of the environment 200 may be embodied as hardware, firmware, software, or a combination thereof. As such, in some embodiments, one or more of the components of the environment 200 may be embodied as circuitry or collection of electrical devices (e.g., model manager circuitry 202, scan dispositioner circuitry 206, merge manager circuitry 208, impression manager circuitry 212, and/or manufacturing manager circuitry 214). It should be appreciated that, in such embodiments, one or more of the model manager circuitry 202, the scan dispositioner circuitry 206, the merge manager circuitry 208, the impression manager circuitry 212, and/or the manufacturing manager circuitry 214 may form a portion of one or more of the processor 120, the I/O subsystem 122, and/or other components of the computing device 100. Additionally, in some embodiments, one or more of the illustrative components may form a portion of another component and/or one or more of the illustrative components may be independent of one another.

The model manager 202 is configured to generate multiple models 204. Each model 204 may be embodied as a three-dimensional model indicative of a dental impression of a client's dental arch (e.g., mandibular arch or maxillary arch). The models 204 may be generated by scanning the corresponding dental impression to generate the model 204. Although illustrated as a model of dental impressions, in some embodiments, each model 204 may be embodied as a three-dimensional model of a different physical object. As described below, the model manager 202 may be further configured to generate additional models 204 if a merged model 204 is not indicative of the complete anatomy of a customer's dental arch.

The scan dispositioner 206 is configured to determine whether a model 204 (including a merged model 204) is indicative of a complete anatomy of the customer's dental arch. That determination may be based on quality review data provided for each model 204 by a technician.

The merge manager 208 is configured to merge two models 204 using a merge strategy 210 to generate a merged model 204 if an original, input model 204 is not indicative of the complete anatomy of the customer's dental arch. Each merge strategy 210 may be embodied as any algorithm, process, policy, or other strategy that may be used to select geometry from the input models 204 to be included in the merged model 204. In some embodiments, the merge manager 208 may be configured to merge the models 204 using multiple merge strategies 210 to generate multiple merge models 204. The merge manager 208 may be configured to select a merged model 204 from multiple results, for example by receiving a selection of the best-merged model 204 from a technician.

To perform the merge, the merge manager 208 may be configured to align geometry of the models 204 based on a common point or other common location. The merge manager 208 is configured to select geometry from either of the models 204 using the merge strategy 210. The selected geometry is associated with a common anatomical location in the customer's dental arch. Selecting the geometry using the merge strategy 210 may include, for example, determining which of the dental impressions associated with the models 204 includes more detail associated with the common anatomical location and/or determining which of the models 204 includes greater depth associated with the common anatomical location. The merge manager 208 may be further configured to clean the merged model 204 to generate a closed surface, for example by performing Poisson surface reconstruction or by performing a gap closing algorithm.

The impression manager 212 may be configured to obtain additional dental impressions if the input models 204 and/or the merged model 204 do not include a complete representation of the customer's dental arch. The manufacturing manager 214 may be configured to use the input models 204 and/or the merged model 204 for sculpting and setup or otherwise use the models 204 for manufacturing.

Figure 3:
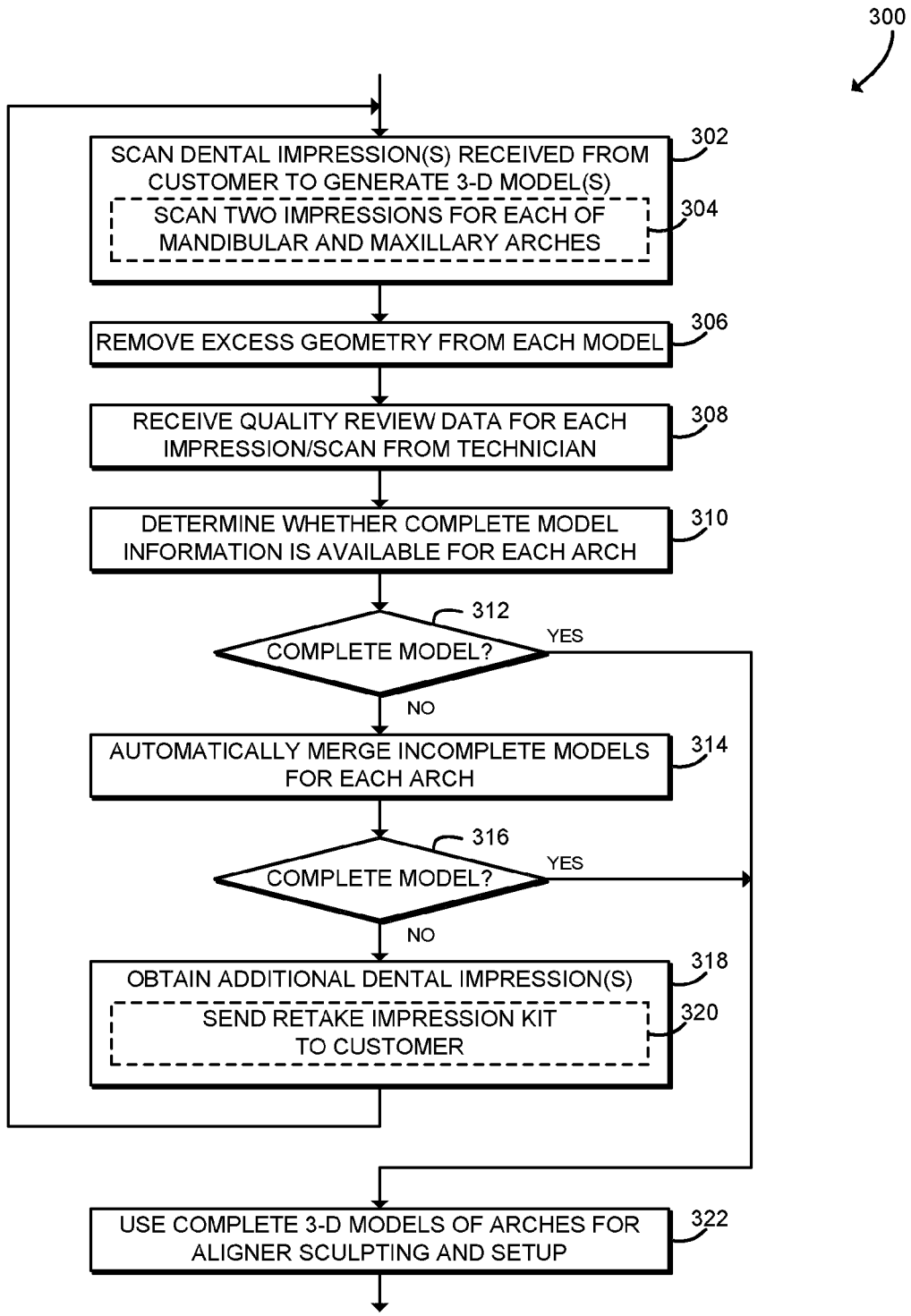
FIG. 3 is a simplified flow diagram of at least one embodiment of a method for capturing and processing three-dimensional scans of dental impressions that may be executed by the computing device of FIGS. 1 and 2.

Referring now to FIG. 3, in use, the computing device 100 may execute a method 300 for capturing and processing three-dimensional scans of dental impressions. It should be appreciated that, in some embodiments, the operations of the method 300 may be performed by one or more components of the environment 200 of the computing device 100 as shown in FIG. 2. The method 300 begins in block 302, in which the computing device 100 scans one or more dental impressions received from a customer to generate three-dimensional models 204. The computing device 100 may use any stereoscopic imager, photometric scanner, laser scanner, infrared scanner, structured light sensor, or other three-dimensional scanning technology to scan the dental impressions. Each model 204 may be embodied as a three-dimensional representation of the geometry of a dental impression, which is in turn a negative representation of a dental arch (e.g., a mandibular arch or maxillary arch) of the customer. Illustratively, the models 204 are embodied as STL files that describe the surface geometry of the corresponding dental impressions. In other embodiments, the models 204 may be embodied as any surface or solid three-dimensional modeling data.

The computing device 100 may scan several impressions produced by the customer in connection with an at-home dental impression kit. For example, in some embodiments, in block 304 the computing device 100 may scan two impressions for each of the customer's mandibular arch (i.e., the customer's lower teeth) and the customer's maxillary arch (i.e., the customer's upper teeth), producing a total of four models 204. Additionally or alternatively, in some embodiments the computing device 100 may scan a different number of dental impressions. For example, as described further below, a retake kit may include multiple dental impressions for one or more of the user's dental arches.

Additionally, although illustrated in FIG. 3 as scanning the dental impressions to generate the models 204, it should be understood that the computing device 100 may receive the models 204 from another device or otherwise acquire the models 204. For example, in some embodiments the dental impressions may be scanned by a device located at a remote imaging lab, mobile imaging lab, or other remote location.

In block 306, the computing device 100 removes excess geometry from each model 204. The excess geometry may be removed, for example, by a technician using a 3-D editor, or may be removed automatically.

In block 308, the computing device 100 receives quality review data for each impression/scan from a technician. The technician may, for example, interactively view a representation of each model 204 and then provide the quality review data. The quality review data may indicate whether the corresponding dental impression includes a complete impression of the user's dental arch. Due to incorrect use by the customer or other factors, a dental impression may not include clear impressions of one or more teeth or other areas of a dental arch. Thus, in some embodiments, the quality review data may identify incomplete areas of each arch (e.g., incomplete sides, teeth, or other parts of the impression).

In block 310, for each of the mandibular arch and the maxillary arch, the computing device 100 determines whether one of the models 204 is complete. For example, the computing device 100 may determine whether any of the models 204 includes data for a complete impression of a dental arch using the quality review data. In block 312, the computing device 100 checks whether a model 204 is complete for both of the dental arches. If so, the method 300 branches ahead to block 322, described below. If a model 204 is not complete for either arch, the method 300 advances to block 314.

In block 314, for one or more of the dental arches, the computing device 100 automatically merges incomplete models 204 to generate a merged model 204. For example, the computing device 100 may merge two models 204 of the customer's mandibular arch and/or may merge two models 204 of the customer's maxillary arch. The computing device 100 may use one or more merge strategies 210 to select geometry from one of the models 204 and replace geometry in the other model 204 with the selected geometry. Thus, after merging the merged model 204 may include geometry generated by scanning more than one physical object (e.g., from more than one dental impression). One potential embodiment of a method for automatically merging the models 204 is described below in connection with FIG. 4.

In block 316, for each of the mandibular arch and the maxillary arch, the computing device 100 checks whether one of the models 204, including the merged model 204, is complete. If so, the method 300 branches ahead to block 322, described below. If a model 204 is not complete, the method 300 advances to block 318.

In block 318, the computing device 100 obtains additional dental impressions for the incomplete dental arch(es). In some embodiments, in block 320 the computing device 100 may cause a retake impression kit to be sent to the customer. The retake impression kit may include materials (e.g., dental trays and thixotropic impression material) to create one or more dental impressions for the incomplete dental arch or arches. After obtaining additional dental impressions, the method 300 loops back to block 302, in which the additional dental impressions may be scanned, checked for completeness, and potentially merged with the existing models 204.

Referring back to block 316, if a model 204 is complete for both of the dental arches, then the method 300 advances to block 322, in which the computing device 100 uses the complete models 204 of the customer's dental arches to perform sculpting and setup. For example, a complete model 204 may be used to generate a three-dimensional treatment plan for the customer, to generate or manufacture a positive model of the customer's dental arches, and/or to manufacture invisible aligners for the customer. After using the complete models 204, the method 300 is completed. The method 300 may be executed again for an additional customer and/or for additional dental impressions.

Figure 4:
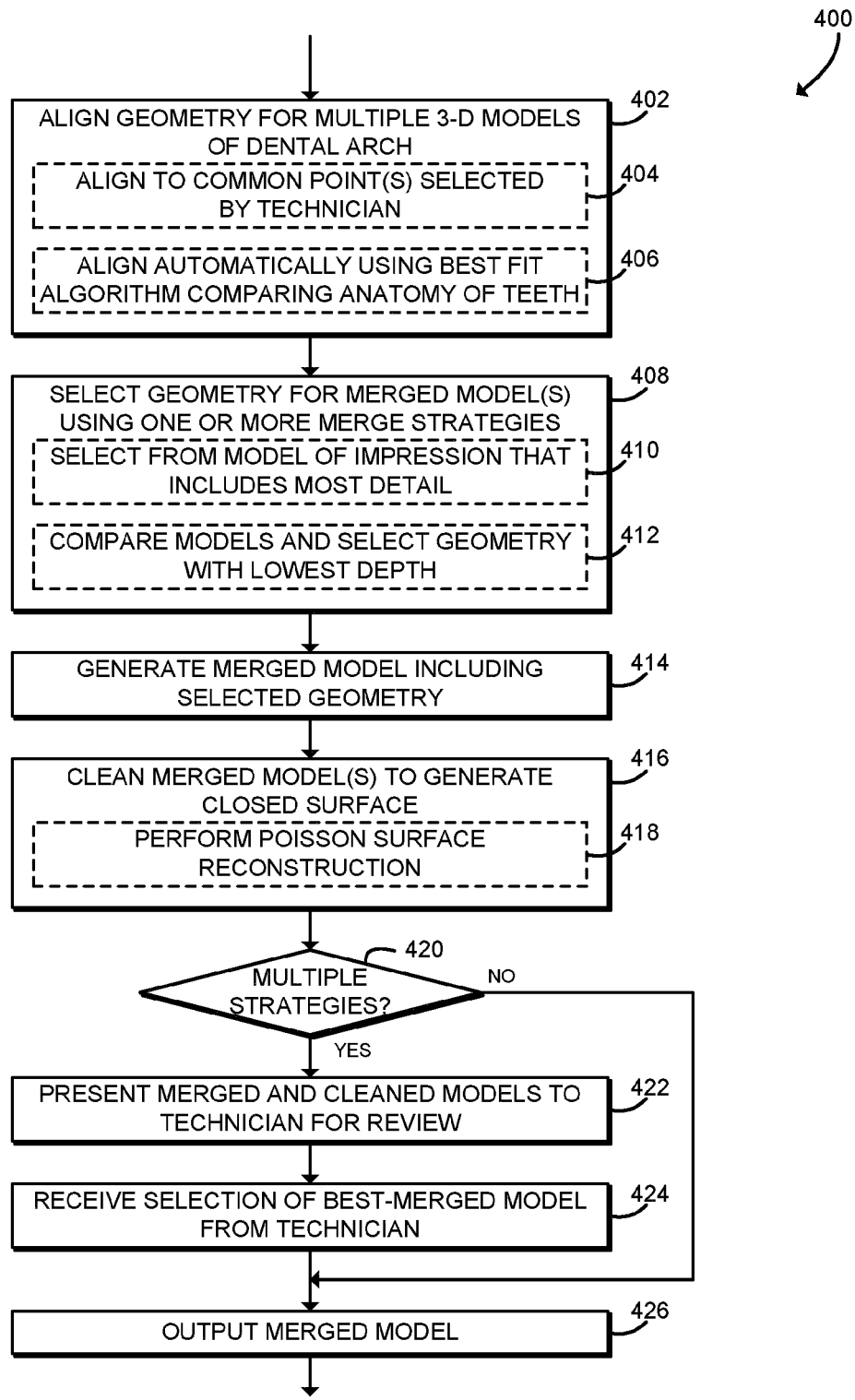
FIG. 4 is a simplified flow diagram of at least one embodiment of a method for merging three-dimensional models that may be executed by the computing device of FIGS. 1 and 2.

Referring now to FIG. 4, in use, the computing device 100 may execute a method 400 for merging three-dimensional models. The method 400 may be executed in connection with block 314 of FIG. 3, as described above. It should be appreciated that, in some embodiments, the operations of the method 400 may be performed by one or more components of the environment 200 of the computing device 100 as shown in FIG. 2. The method 400 begins in block 402, in which the computing device 100 aligns the geometry of multiple models 204. Each of the models 204 may be generated from a scan of a dental impression of one of the customer's dental arches. For example, the computing device 100 may merge two models 204 associated with the mandibular arch of the customer or may merge two models 204 associated with the maxillary arch of the customer. The geometry of the models 204 is aligned according to the underlying geometry of the dental impressions and, therefore, the corresponding anatomy of the customer's dental arches. In some embodiments, in block 404 the models 204 may be aligned to one or more common points selected by a technician. For example, the technician may interactively identify teeth or other common features in each of the models 204. In some embodiments, in block 406 the models 204 may be aligned automatically using a best fit algorithm that compares the anatomy of the teeth represented in each of the models 204.

After aligning the geometry, in block 408 the computing device 100 selects geometry from the models 204 to include in a merged model 204 using one or more merge strategies 210. The computing device 100 may select geometry from a model 204 to fill in incomplete parts of the other model 204. In some embodiments, in block 410 the computing device 100 may select geometry from the model 204 corresponding to the dental impression that includes the most detail of the user's anatomy. For example, the computing device 100 may select geometry from a model 204 of a dental impression that captures the customer's anatomy from the tip of the teeth to the gingival line.

In some embodiments, in block 412 the computing device 100 may compare the models 204 and select geometry from the model 204 having the greatest depth. In other words, the computing device 100 may select geometry from the model 204 with the greatest distance from bottom of the impression (e.g., corresponding to the tip of a tooth) up to the top of the impression (e.g., the surface of the impression mixture). For example, the computing device 100 may combine the models 204 into multiple layers, and then select lower points from the layers. Having lower depth in the model 204 indicates that the dental impression was also deeper, and deeper dental impressions tend to capture greater detail of the customer's tooth and gum anatomy. Additionally, using the deeper model 204 may remove noise from the model 204, such as spikes in the impression caused by the impression mixture pulling up as the impression is removed from the customer's teeth.

In block 414, the computing device 100 generates the merged model 204 including the selected geometry. The merged model 204 may include 3D geometry from both of the models 204, with the less-detailed components of the geometry removed.

In block 416, the computing device 100 may clean the merged model 204 to generate a closed surface, also known as a watertight mesh. In some embodiments, the model 204 may be embodied as a mesh or other surface model, and that mesh may include holes or be otherwise open. Generating a closed surface may allow the merged model 204 to define a solid object that can, for example, be input to a 3-D printer. The computing device 100 may use any technique to clean the merged model 204. In some embodiments, in block 418 the computing device 100 may perform Poisson surface reconstruction to generate the closed surface. Additionally or alternatively, in some embodiments the computing device 100 may perform a gap closing algorithm for surface reconstruction to generate the closed surface.

In block 420, the computing device 100 determines whether multiple merge strategies 210 were used to generate multiple merged models 204. As described above in connection with block 408, the computing device 100 may use more than one merge strategy 210 to merge the models 204. Each merge strategy 210 may generate a different merged model 204. If a single merge strategy 210 is used, the method 400 branches ahead to block 426. If more than one merge strategy 210 is used, the method 400 advances to block 422.

In block 422, the computing device 100 presents the merged and cleaned models 204 generated using the multiple merge strategies 210 to a technician for review. In block 424, the computing device 100 receives a selection of a merged model 204 from the technician. The technician may, for example, manually select the best-merged model 204.

In block 426, the computing device 100 outputs the merged model 204. As described above in connection with FIG. 3, if the merged model 204 is complete, it may be used to prepare a three-dimensional treatment plan for the customer, to generate or manufacture a positive model of the customer's dental arches, to manufacture invisible aligners for the customer, or otherwise be used for dental treatment. After outputting the merged model 204, the method 400 is completed. The method 400 may be executed repeatedly to perform additional merges.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A computing device for dental impression scan merging, the computing device comprising:
    a model manager configured to generate a first model and a second model, the first model comprising a three-dimensional model indicative of a first dental impression of a dental arch of a user, the second model comprising a three-dimensional model indicative of a second dental impression of the same dental arch of the user;
    a merge manager configured to merge the first model and the second model, wherein merging the first model and the second model comprises:
        selecting a geometry of the first model or a geometry of the second model, the geometry of the first model and the geometry of the second model being associated with a common feature in the dental arch of the user; and
        generating a merged model that includes the selected geometry; and
    a manufacturing manager configured to use the merged model for manufacturing a dental aligner specific to the dental arch of the user and being configured to reposition one or more teeth of the user.

2. The computing device of claim 1, wherein:
    the model manager is further configured to generate a third model that comprises a three-dimensional model indicative of a third dental impression of the dental arch of the user; and
    the merge manager is further configured to generate a second merged model by merging the first model, the second model, and the third model.

3. The computing device of claim 1, wherein merging the first model and the second model further comprises:
    aligning the geometry of the first model and the geometry of the second model;
    selecting geometry of the first model to include in the merged model; and
    selecting geometry of the second model to include in the merged model, wherein the geometry of the second model completes an incomplete part of the first model; and
    wherein generating the merged model includes the selected geometry of the first model and the selected geometry of the second model.

4. The computing device of claim 1, wherein selecting the geometry of the first model or the geometry of the second model comprises:
    determining whether the first dental impression includes more detail at the common feature than the second dental impression; and
    selecting the geometry of the first model based on the first dental impression including more detail at the common feature.

5. The computing device of claim 1, wherein selecting the geometry of the first model or the geometry of the second model comprises:
    determining whether the first model includes greater depth at the common feature than the second model; and
    selecting the geometry of the first model based on the first model including greater depth at the common feature.

6. The computing device of claim 5, wherein determining whether the first model includes greater depth comprises determining whether the first dental impression includes an impression from a tip of a tooth to a gingival line.

7. The computing device of claim 5, wherein determining whether the first model includes greater depth comprises determining a distance from a bottom of the first dental impression corresponding to a tip of a tooth to a top of the first dental impression corresponding to a surface of a dental impression mixture.

8. The computing device of claim 1, wherein merging the first model and the second model further comprises cleaning the merged model to generate a closed surface.

9. The computing device of claim 1, wherein merging the first model and the second model further comprises generating a plurality of merged models.

10. The computing device of claim 9, wherein the merge manager is further configured to select a particular merged model from the plurality of merged models.

11. The computing device of claim 1, wherein:
    generating the first model comprises receiving a scan of the first dental impression; and
    generating the second model comprises receiving a scan of the second dental impression.

12. A method for dental impression scan merging, the method comprising:
    generating, by a computing device, a first model and a second model, the first model comprising a three-dimensional model indicative of a first dental impression of a dental arch of a user, the second model comprising a three-dimensional model indicative of a second dental impression of the same dental arch of the user;
    merging, by the computing device, the first model and the second model, wherein merging the first model and the second model comprises:
        selecting a geometry of the first model or a geometry of the second model, the geometry of the first model and the geometry of the second model being associated with a common feature in the dental arch of the user; and
        generating a merged model that includes the selected geometry; and
    manufacturing a dental aligner based on the merged model, the dental aligner being specific to the dental arch of the user and being configured to reposition one or more teeth of the user.

13. The method of claim 12, wherein selecting the geometry of the first model or the geometry of the second model comprises:
    determining whether the first dental impression includes more detail at the common feature than the second dental impression; and
    selecting the geometry of the first model based on the first dental impression including more detail at the common feature.

14. The method of claim 12, wherein selecting the geometry of the first model or the geometry of the second model comprises:
    determining whether the first model includes greater depth at the common feature than the second model; and selecting the geometry of the first model based on the first model including greater depth at the common feature.

15. The method of claim 14, wherein determining whether the first model includes greater depth comprises determining whether the first dental impression includes an impression from a tip of a tooth to a gingival line.

16. The method of claim 14, wherein determining whether the first model includes greater depth comprises determining a distance from a tip of a tooth in the dental impression to a surface of a dental impression mixture.

17. The method of claim 14, wherein determining whether the first model includes greater depth comprises:
    combining the first model and the second model into multiple layers; and
    identifying lower points from the multiple layers, the lower points corresponding to the selected geometry.

18. The method of claim 12, wherein merging the first model and the second model further comprises:
    aligning the geometry of the first model and the geometry of the second model using one or more points of the first model and of the second model;
    selecting geometry of the first model to include in the merged model; and
    selecting geometry of the second model to include in the merged model, wherein the geometry of the second model completes an incomplete part of the first model; and
    wherein the merged model includes the selected geometry of the first model and the selected geometry of the second model.

19. A method for dental impression scan merging, the method comprising:
    generating, by a computing device, a first model and a second model, the first model comprising a three-dimensional model of an initial dental impression of a dental arch of a user, the second model comprising a three-dimensional model of a redundant dental impression of the same dental arch of the user;
    merging, by the computing device, the first model and the second model, wherein merging the first model and the second model comprises aligning one or more common points of the first model and of the second model;
    manufacturing a dental aligner based on the merged model, the dental aligner being specific to the dental arch of the user and being configured to reposition one or more teeth of the user.

20. The method of claim 19, further comprising scanning the initial dental impression and the redundant dental impression with a scanning device to acquire information necessary to generate the first model and the second model.

* * * * *